United States Patent
Lin

(10) Patent No.: US 10,976,443 B2
(45) Date of Patent: *Apr. 13, 2021

(54) METHOD AND DEVICE FOR DETERMINING A POSITIONING ACCURACY GRADE, AND ELECTRONIC DEVICE HAVING THE SAME

(71) Applicant: GUANGDONG OPPO MOBILE TELECOMMUNICATIONS CORP., LTD., Guangdong (CN)

(72) Inventor: Huaqiu Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/569,038

(22) Filed: Sep. 12, 2019

(65) Prior Publication Data
US 2020/0003904 A1 Jan. 2, 2020

Related U.S. Application Data

(63) Continuation of application No. PCT/CN2017/106600, filed on Oct. 17, 2017.

(30) Foreign Application Priority Data

Mar. 16, 2017 (CN) .......................... 201710157488.2

(51) Int. Cl.
*H04W 24/00* (2009.01)
*G01S 19/42* (2010.01)
(Continued)

(52) U.S. Cl.
CPC ............ *G01S 19/421* (2013.01); *G01S 19/48* (2013.01); *H04B 17/21* (2015.01)

(58) Field of Classification Search
CPC ....... H04W 64/00; H04W 4/02; H04W 24/00; H04W 24/08
(Continued)

(56) References Cited

U.S. PATENT DOCUMENTS

| 8,036,679 | B1 | 10/2011 | Barbeau et al. |
| 8,612,756 | B1 | 12/2013 | Meier et al. |

(Continued)

FOREIGN PATENT DOCUMENTS

| CN | 102036165 | 4/2011 |
| CN | 102645221 | 8/2012 |

(Continued)

OTHER PUBLICATIONS

WIPO, ISR for PCT/CN2017/106600, Jan. 17, 2018.
(Continued)

*Primary Examiner* — Temica M Beamer
(74) *Attorney, Agent, or Firm* — Hodgson Russ LLP

(57) ABSTRACT

A method, a device, and an electronic device for determining a positioning accuracy grade are provided. In the method, a predetermined list is created. The predetermined list is a list of at least one application with a positioning accuracy reaching up to a predetermined threshold. Operation preference information of a user operating is obtained a current third-party application selected from a plurality of third-party applications, which applies a positioning system in an electronic device. A positioning accuracy grade of the positioning system is determined correspondingly based on the operation preference information.

20 Claims, 5 Drawing Sheets

S21 — A predetermined list may be created. The predetermined list is a list of at least one application with a positioning accuracy reaching up to a predetermined threshold.

S22 — Operation preference information of a user operating a current third-party application selected from a plurality of third-party applications can be obtained, which applies a positioning system in an electronic device.

S23 — The positioning accuracy grade of the positioning system is determined correspondingly based on the operation preference information, wherein the positioning accuracy grade includes a first grade and a second grade, wherein a positioning accuracy of the first grade is higher than that of the second grade.

(51) Int. Cl.
*H04B 17/21* (2015.01)
*G01S 19/48* (2010.01)

(58) Field of Classification Search
USPC .............................. 455/456.1, 67.11, 226.1
See application file for complete search history.

(56) References Cited

U.S. PATENT DOCUMENTS

| | | |
|---|---|---|
| 2010/0255856 A1 | 10/2010 | Kansal et al. |
| 2011/0111772 A1 | 5/2011 | Tysowski et al. |
| 2012/0050208 A1 | 3/2012 | Dietz |

FOREIGN PATENT DOCUMENTS

| | | |
|---|---|---|
| CN | 105009660 | 10/2015 |
| CN | 105682198 | 6/2016 |
| CN | 106973150 | 7/2017 |

OTHER PUBLICATIONS

SIPO, First Office Action for CN Application No. 201710157488.2, dated Mar. 4, 2019.
EPO, Communication for EP Application No. 17901267.9, dated Jan. 26, 2021.
IPI, Office Action for IN Application No. 201917041758, dated Jan. 19, 2021.

METHOD AND DEVICE FOR DETERMINING A POSITIONING ACCURACY GRADE, AND ELECTRONIC DEVICE HAVING THE SAME

CROSS-REFERENCE TO RELATED APPLICATION

This application is a continuation of International Application No. PCT/CN2017/106600, filed Oct. 17, 2017, which claims priority to Chinese Patent Application No. 201710157488.2, filed Mar. 16, 2017. The entire disclosures of the aforementioned applications are incorporated herein by reference.

TECHNICAL FIELD

The present disclosure relates to the field of consumer devices in general. More particularly, and without limitation, the disclosed embodiments relate to a method, a device, and an electronic device for determining a positioning accuracy grade of a positioning system.

BACKGROUND

With the development of Internet technology, more and more applications are developed based on positioning services, to obtain location information of a user of an electronic device, via location technology to provide the user with corresponding value-added services. Such as navigation, searching for surrounding life service sites, and weather forecasts, etc. The positioning service usually performs a function of locating based on Global Positioning System (GPS), wireless networks, and communication stations.

SUMMARY

The present disclosure provides a method, a device, and an electronic device for determining a positioning accuracy grade, which can reduce energy consumption and improve a transmission speed of positioning information.

In a first aspect, a method for determining a positioning accuracy grade is provided, in accordance with an embodiment of the present disclosure. In the method:

a predetermined list may be created. The predetermined list is a list of at least one application with a positioning accuracy reaching up to a predetermined threshold;

operation preference information of a user operating a current third-party application selected from a plurality of third-party applications may be obtained, which applies a positioning system in an electronic device; and the positioning accuracy grade of the positioning system may be determined correspondingly based on the operation preference information, wherein the positioning accuracy grade includes a first grade and a second grade, and a positioning accuracy of the first grade is higher than that of the second grade.

In a second aspect, a device for determining a positioning accuracy grade is provided, in accordance with an embodiment of the present disclosure. The device includes:

a creating module, configured to create a predetermined list, wherein the predetermined list is a list of at least one application with a positioning accuracy reaching up to a predetermined threshold;

an obtaining module, configured to obtain operation preference information of a user operating a current third-party application selected from a plurality of third-party application, which applies a positioning system in an electronic device; and a determination module, configured to determine the positioning accuracy grade of the positioning system, correspondingly based on the operation preference information, wherein the positioning accuracy grade includes a first grade and a second grade, wherein a positioning accuracy of the first grade is higher than that of the second grade.

In a fourth aspect, an electronic device is provided, in accordance with an embodiment of the present disclosure. The electronic device includes a memory, a processor, and a computer program stored in the memory and configured to be executed by the processor, wherein the processor is configured to execute the computer program stored in the memory to perform the method for determining a positioning accuracy grade basing on any of the embodiments of the present disclosure.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

Figure 1:
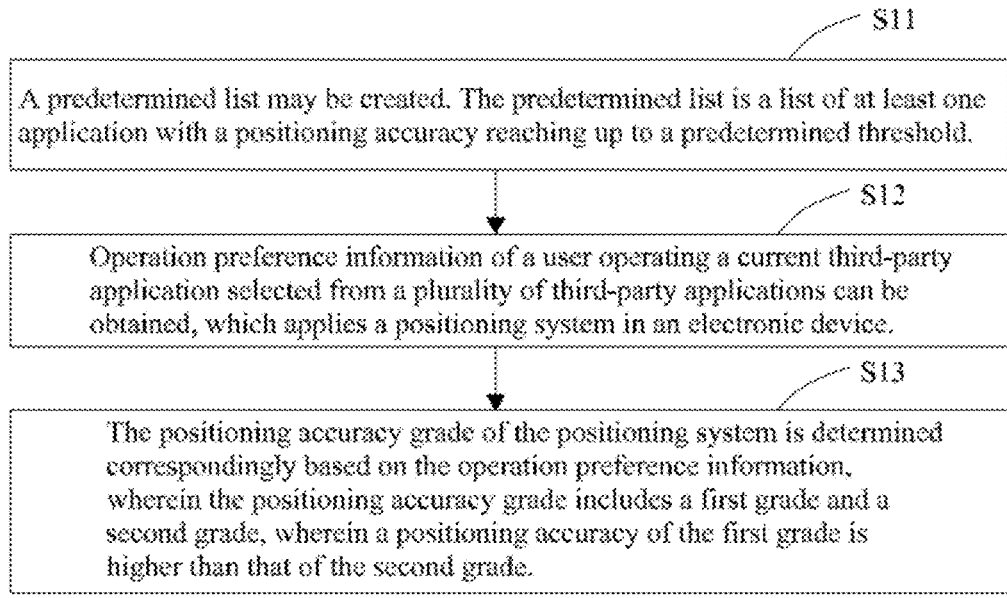
FIG. 1 illustrates a schematic flowchart of a method for determining a positioning accuracy grade, in accordance with an embodiment of the present disclosure.

The technical solutions in the embodiments of the present disclosure will be clearly and completely described in the following with reference to the accompanying drawings. It is understood that the specific embodiments described herein are merely illustrative of the disclosure and are not intended to limit the disclosure. It should also be noted that, for ease of description, only some but not all of the structures related to the present disclosure are illustrated in the drawings. All other embodiments obtained by those skilled in the art based on the embodiments of the present disclosure without any creative efforts are fall in the scope claimed by the present disclosure.

The terms "first", "second" and "third" and the like in the present disclosure are configured to distinguish different objects, and are not intended to describe a specific order. Furthermore, the terms "comprise" and "include", and "have" are intended to cover a non-exclusive inclusion. For example, a process, a method, a system, a product, or a device that comprises a series of steps or modules is not limited to the listed steps or modules, but optionally includes steps or modules not listed, or alternatively other steps or modules inherent to these processes, methods, products or equipment.

References to "embodiment" herein mean that a particular feature, structure, or characteristic described in connection with the embodiments can be included in at least one embodiment of the disclosure. The appearances of the phrases in various places in the specification are not necessarily referring to the same embodiments, and are not exclusive or alternative embodiments that are mutually exclusive. Those skilled in the art will understand and implicitly understand that the embodiments described herein can be combined with other embodiments.

An execution subject of a method for determining a positioning accuracy grade that is provided by embodiments of the present disclosure, may be a device for determining a positioning accuracy grade that is provided by embodiments of the present disclosure, or may be an electronic device integrated with the device for determining a positioning accuracy grade (such as a notebook, a handheld computer, a tablet computer, a smart phone, a smart wearable device, a vehicle smart device, etc.

When a positioning service (taking GPS as an example) is applied, basing on how the GPS works, after receiving GPS signals from GPS satellites, a GPS chip will continuously run a polynomial to estimate an actual position of a user basing on a signal strength of each satellite. An accuracy of the actual information may converge continuously; an accuracy value is also decreasing. When the accuracy value is smaller than a predetermined threshold, the actual position just estimated is transmitted to an electronic device. When the predetermined threshold is getting larger, a transmission speed of the GPS for transmitting the actual position is getting faster, and the positioning accuracy is getting lower. Conversely, when the predetermined threshold is smaller, the transmission speed of the GPS for transmitting the actual position is lower, and the positioning accuracy is higher. In order to abstain a higher positioning accuracy, the predetermined threshold of GPS for transmitting will be determined in a small range by most user, such as 70 meters, but the transmission speed will be slower. However, some application services do not require high-accuracy positioning. For example, a weather-based application only needs to know the city where the user is located to provide a corresponding service. For example, the predetermined threshold for transmitting is 1000 meters. However, because the predetermined threshold of positioning accuracy for transmitting can not be dynamically determinable in the GPS platform, for an electronic device with a high-accuracy positioning, it takes a relative more power for running applications with a low-accuracy positioning, and a speed for transmitting the positioning information is lower. Therefore, further improvement is in needed.

A method for determining a positioning accuracy grade, in accordance with the embodiments of the present disclosure. The method includes:

creating a predetermined list, wherein the predetermined list is a list of at least one application with a positioning accuracy reaching up to a predetermined threshold;

obtaining operation preference information of a user operating a current third-party application selected from a plurality of third-party application, which applies a positioning system in an electronic device; and determining the positioning accuracy grade of the positioning system correspondingly based on the operation preference information, wherein the positioning accuracy grade includes a first grade and a second grade, and a positioning accuracy of the first grade is higher than that of the second grade.

In some embodiments, the operation of obtaining the operation preference information of a user operating a current third-party application selected from a plurality of third-party application, which applies a positioning system in an electronic device, includes:

obtaining a total number of operations that the user operating the plurality of third-party applications, which apply the positioning system in the electronic device, and a number of times that the at least one application in the predetermined list being invoked; and determining the operation preference information of the user operating the current third-party applications, which applies the positioning system in the electronic device, according to a corresponding relationship of the number of times that the at least one application in the predetermined list being invoked and the total number of operations.

In some embodiments, before the operation of obtaining the total number of operations that the user operating the plurality of third-party applications, which apply the positioning system in the electronic device, and the number of times that the at least one application in the predetermined list being invoked, the method further includes:

determining whether or not the current third-party application is listed in the predetermined list when the user activates the positioning system via the current third-party application;

increasing the number of times that the at least one application in the predetermined list being invoked by one, and increasing the total number of operations that the user operating the plurality of third-party applications by one, which apply the positioning system in the electronic device, when the current third-party application is listed in the predetermined list; and maintaining the number of times that the at least one application in the predetermined list being invoked, and increasing the total number of operations that the user operating the plurality of third-party applications by one, which apply the positioning system in the electronic device, when the current third-party application is not listed in the predetermined list.

In some embodiments, the operation of determining the operation preference information of the user operating the current third-party application, which applies the positioning system in the electronic device, according to the corresponding relationship of the number of times that the at least one application in the predetermined list being invoked and the total number of operations, includes:

determining the operation preference information as a high-accuracy positioning operation when a ratio, of the number of times that the at least one application in the predetermined list being invoked to the total number of operations, reaches up to a predetermined ratio; and determining the operation preference information as a low-accuracy positioning operation when the ratio, of the number of times that the at least one application in the predetermined list being invoked to the total number of operations, is smaller than the predetermined ratio.

In some embodiments, the operation of obtaining the operation preference information of a user operating a current third-party application selected from a plurality of third-party application, which applies a positioning system in an electronic device, includes:

obtaining the total number of operations and a total operation time that the user operating the plurality of third-party applications, which apply the positioning system in the electronic device; obtaining a number of times and a total invoked time that the at least one application in the predetermined list being invoked; and obtaining a first usage frequency of the at least one application in the predetermined list and a second usage frequency of at least one of the plurality of third-party applications which is not in the predetermined list;

determining the operation preference information as a high-accuracy positioning operation when the first usage frequency of the at least one application in the predetermined list is larger than the second usage frequency of the at least one of the plurality of third-party applications which is not in the predetermined list; and determining the operation preference information as a low-accuracy positioning operation when the first usage frequency of the at least one application in the predetermined list is smaller than or equal to the second usage frequency of the at least one of the plurality of third-party applications which is not in the predetermined list.

In some embodiments, the operation of determining a positioning accuracy grade of the positioning system correspondingly based on the operation preference information, includes:

determining the positioning accuracy grade of the positioning system as the first grade, when the operation preference information is determined as a high-accuracy positioning operation; and determining the positioning accuracy grade of the positioning system as the second grade, when the operation preference information is determined as a low-accuracy positioning operation.

As shown in FIG. 1, FIG. 1 illustrates a schematic flowchart of a method for determining a positioning accuracy grade, in accordance with an embodiment of the present disclosure. The method may begin at block S11.

At block S11, a predetermined list may be created. The predetermined list is a list of at least one application with a positioning accuracy reaching up to a predetermined threshold.

In some embodiments, an application list of applications based on a positioning service can be created via a big data services, by capturing data from an application platform or an application market. The application list can include applications, such as a map navigation application, a rescue service application, an enterprise employee management application, a vehicle scheduling application, a logistics application, a monitoring application, a shopping application, a weather forecast application, and acquisition information about family lives (such as clothing, food, housing and travel information) application. And then the at least one application with the positioning accuracy reaching up to the predetermined threshold can be sifted from the application list, wherein for example, the predetermined threshold may be 100 meters. Application information about all of the applications with the positioning accuracy reaching up to 100 meters is stored in the predetermined list, wherein the application information in the predetermined list may include information such as an application name, and a default positioning accuracy value of the application, etc. The predetermined threshold may be configured by a user, or may be determined according to an experimental test data, and the example is not limited to the present disclosure.

At block S12, operation preference information of a user operating a current third-party application selected from a plurality of third-party applications can be obtained, which applies a positioning system in an electronic device.

In some embodiment, the plurality of third-party applications may include at least one application that requires a high-accuracy positioning and is listed in the predetermined list, and at least one application that do not require a high-accuracy positioning and is not listed in the predetermined list. When a user operate the current third-party application, the current third-party application is selected from the plurality of applications. That is, the current third-party application may be listed in the predetermined list, and the current third-party application may not be listed in the predetermined list. The third-party applications may apply the positioning system in the electronic device when activated by the user.

In some embodiments, the operation preference information can be obtained by counting a historical operation record about the plurality of third-party applications that apply the positioning system in the electronic device. An operation habit and a requirement of the user can be analyzed and obtained. For example, the GPS may usually work to perform a navigation function when activated by some users; the GPS may usually work when other users are shopping or watching weather forecasts.

A range of the historical operation record can be determined according to actual requirements. For example, the historical operation record can be generated basing a range from a first time the electronic device enters Network to a closing time of using. For another example, the historical operation record can be generated according to historical operations of the user in the last month.

At block S13, the positioning accuracy grade of the positioning system is determined correspondingly based on the operation preference information, wherein the positioning accuracy grade includes a first grade and a second grade, wherein a positioning accuracy of the first grade is higher than that of the second grade.

In an embodiment, the positioning accuracy grade of the positioning system may also be determined according to an application type of the current third-party application that is currently activated and applying the positioning system. The application type of the current third-party application can be determined after matching the current third-party application with the application information listed in the predetermined list. The application information may include information such as application names and default positioning accuracy values. The application type of the current third-party application can be determined by matching an application name of the current third-party application with the application names in the predetermined list. For example, the predetermined list is a list of at least one application with a positioning accuracy reaching up to the predetermined threshold, that is, the predetermined list is a list of at least one application that requires a high-accuracy GPS positioning. The application type of the at least one application in the predetermined list can be determined as a high-accuracy positioning type, and the application type of other applications that is not in the predetermined list can be determined as a low-accuracy positioning type. The positioning accuracy grade of the positioning system may be determined as the first grade, when the application type of the current third-party application is determined as a high-accuracy positioning type. The positioning accuracy grade of the positioning system may be determined as the second grade, when the application type of the current third-party application is determined as a high-accuracy positioning type.

In some embodiments, the operation for obtaining the operation preference information of a user operating a current third-party application selected from a plurality of third-party application, which applies a positioning system in an electronic device, may include operations as followings.

A total number of operations that the user operating the plurality of third-party applications, which apply the positioning system in the electronic device, is obtained, and a number of times that the at least one application in the predetermined list being invoked, is obtained.

The operation preference information of the user operating the current third-party application, which applies the positioning system in the electronic device, is determined, according to a corresponding relationship of the number of times that the at least one application in the predetermined list being invoked and the total number of operations.

In some embodiments, before the total number of operations that the user operating the plurality of third-party applications, which apply the positioning system in the electronic device, and the number of times that the at least one application in the predetermined list being invoked, are obtained, the method further includes operations as followings.

The current third-party application is determined whether or not it is listed in the predetermined list when activated by the user and when the user activates the positioning system via the current third-party application.

The number of times that the at least one application in the predetermined list being invoked may be increased by one, and the total number of operations that the user operating the plurality of third-party applications, which apply the positioning system in the electronic device may be increased by one when the current third-party application is listed in the predetermined list. The number of times that the at least one application in the predetermined list being invoked may be remained and unchanged, and the total number of operations that the user operating the plurality of third-party applications, which apply the positioning system in the electronic device may be increased by one when the current third-party application is not listed in the predetermined list.

In some embodiments, when the operation preference information of the user operating the current third-party application, which applies the positioning system in the electronic device is being determined, according to the corresponding relationship of the number of times that the at least one application in the predetermined list being invoked and the total number of operations, the procedure may include operations as followings.

The operation preference information is determined as a high-accuracy positioning operation when a ratio, of the number of times that the at least one application in the predetermined list being invoked to the total number of operations, reaches up to a predetermined ratio.

The operation preference information is determined as a low-accuracy positioning operation when the ratio, of the number of times that the at least one application in the predetermined list being invoked to the total number of operations, is less than a predetermined ratio.

In some embodiments, the operation for obtaining the operation preference information of a user operating a current third-party application selected from a plurality of third-party application, which applies a positioning system in an electronic device, can further include operations as followings.

The total number of operations and a total operation time that the user operating the plurality of third-party applications, which apply the positioning system in the electronic device is obtained. The number of times and a total invoked time that the at least one application in the predetermined list being invoked is obtained. Thereby a first usage frequency of the at least one application in the predetermined list and a second usage frequency of at least one of the plurality of third-party applications which is not in the predetermined list is obtained, basing on total number of operations, the total operation time, the invoked time, and the number of times that the at least one application in the predetermined list being invoked.

The operation preference information is determined as a high-accuracy positioning operation when the first usage frequency of the at least one application in the predetermined list is larger than the second usage frequency of the at least one of the plurality of third-party applications which is not in the predetermined list.

The operation preference information is determined as a low-accuracy positioning operation when the first usage frequency of the at least one application in the predetermined list is smaller than or equal to the second usage frequency of the at least one of the plurality of third-party applications which is not in the predetermined list.

In some embodiments, the operation of determining a positioning accuracy grade of the positioning system correspondingly based on the operation preference information may include operations as the followings.

The positioning accuracy grade of the positioning system may be determined as the first grade, when the operation preference information is determined as a high-accuracy positioning operation.

The positioning accuracy grade of the positioning system may be determined as the second grade, when the operation preference information is determined as a low-accuracy positioning operation.

All of the above optional embodiments may be applied in any combination to form an optional embodiment of the present disclosure, and will not be further described herein.

Figure 2:
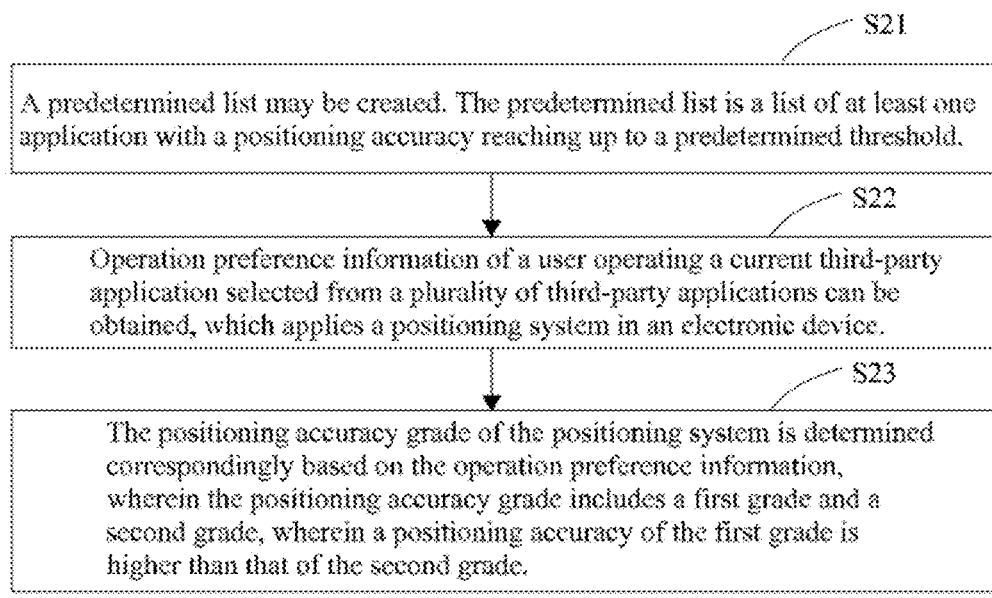
FIG. 2 illustrates a schematic flowchart of a method for determining a positioning accuracy grade, in accordance with an embodiment of the present disclosure.
Figure 3:
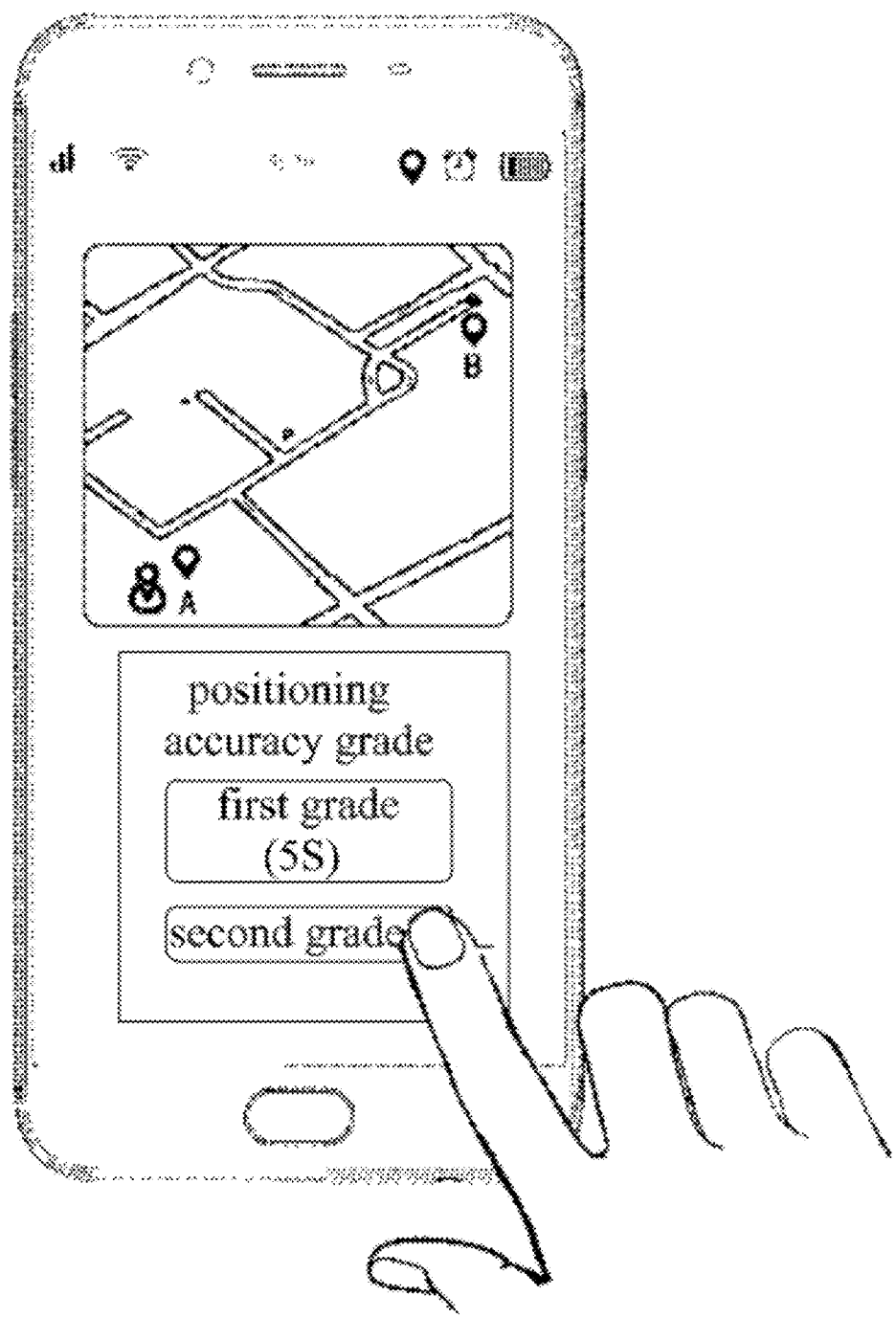
FIG. 3 illustrates a schematic view of an application scenario of a method for determining a positioning accuracy grade, in accordance with an embodiment of the present disclosure.
Figure 4:
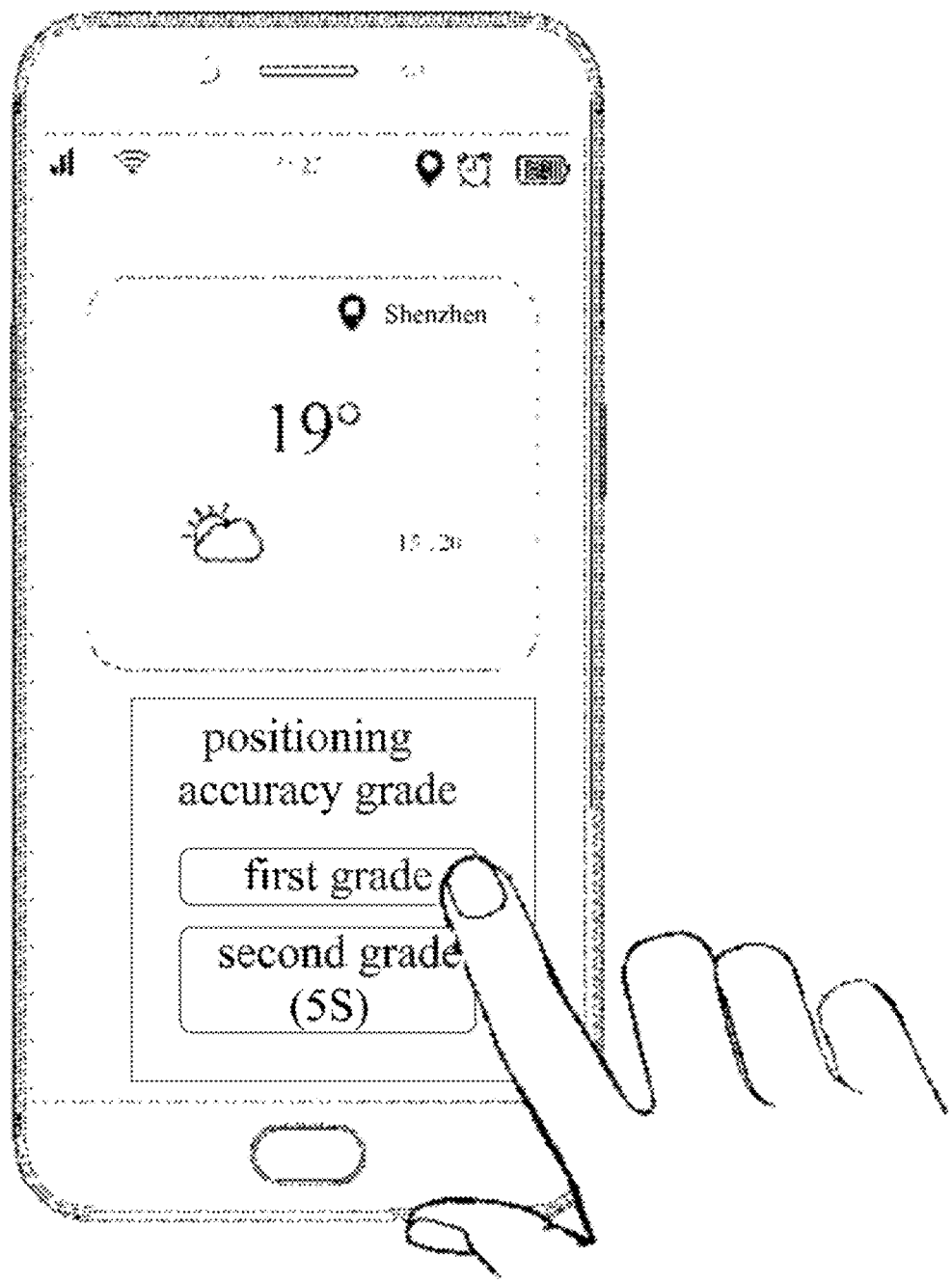
FIG. 4 illustrates a schematic view of an application scenario of a method for determining a positioning accuracy grade, in accordance with another embodiment of the present disclosure.

As illustrated in FIGS. 2 to 4, FIG. 2 illustrates another schematic flowchart of a method for determining a positioning accuracy grade, in accordance with an embodiment of the present disclosure. FIG. 3 illustrates a schematic view of an application scenario of the method for determining a positioning accuracy grade, in accordance with an embodiment of the present disclosure. FIG. 4 illustrates a schematic view of another application scenario of the method for determining a positioning accuracy grade, in accordance with another embodiment of the present disclosure. The method may begin at block S21.

At block S21, a predetermined list may be created. The predetermined list is a list of at least one application with a positioning accuracy reaching up to a predetermined threshold.

In some embodiments, an application list of applications based on a positioning service can be created via a big data services, by capturing data from an application platform or an application market. The application list can include applications, such as a map navigation application, a rescue service application, an enterprise employee management application, a vehicle scheduling application, a logistics application, a monitoring application, a shopping application, a weather forecast application, and acquisition information about family lives (such as clothing, food, housing and travel information) application. Some of these applications require a higher positioning accuracy when in service, such as a map navigation application, a rescue service application, an enterprise employee management application, a vehicle scheduling application. A vehicle rescue application can be taken as an example for the rescue service application. For example, a user of the vehicle may transmit positioning information via the vehicle rescue application. A vehicle rescue service provider can rescue the user basing on the positioning information. At this time, a higher positioning accuracy is required in rescue, for example, the positioning accuracy may be 50 meters. So that the vehicle rescue service provider can arrive at the location of the user accurately and quickly. However, some of the applications do not require a high positioning accuracy, such as a shopping application, a weather forecast application, etc. In the case of a weather application, the positioning accuracy of the weather applications may be 1000 meters, and a weather forecast of a city where the user is located can be obtained when the user is positioning with the positioning accuracy of 1000 meters. And then the at least one application with the positioning accuracy reaching up to the predetermined threshold can be sifted from the application list. For example, the predetermined threshold may be 100 meters. Application information about all of the applications with the positioning accuracy reaching up to 100 meters is stored in the predetermined list, wherein the application information in the predetermined list may include information such as application names, and default positioning accuracy values of the applications, etc. The predetermined threshold may be configured by a user, or may be determined according to an experimental test data, and examples in the description are not limited to the present disclosure.

At block S22, operation preference information of a user operating a current third-party application selected from a plurality of third-party application can be obtained, which applies a positioning system in an electronic device.

In some embodiments, the operation preference information can be obtained by counting a historical operation record about the plurality of third-party applications that apply the positioning system in the electronic device. An operation habit and a requirement of the user can be analyzed and obtained. For example, the GPS may usually work to perform a navigation function when activated by some users. In some embodiments, the GPS may usually work when other users are shopping or watching weather forecasts.

A range of the historical operation record can be determined according to actual requirements. For example, the historical operation record can be generated basing a range from a first time the electronic device enters Network to a closing time of using. For another example, the historical operation record can be generated according to historical operations of the user in the last month.

In an embodiment, the block S22 can be implemented by performing block S221 to block S223.

At block S221, the current third-party application is determined whether or not it is listed in the predetermined list when activated by the user and when the user activates the positioning system via the current third-party application. The number of times that the at least one application in the predetermined list being invoked may be increased by one, and the total number of operations that the user operating the plurality of third-party applications, which apply the positioning system in the electronic device may be increased by one when the current third-party application is listed in the predetermined list. The number of times that the at least one application in the predetermined list being invoked may be remained and unchanged, and the total number of operations that the user operating the plurality of third-party applications, which apply the positioning system in the electronic device may be increased by one when the current third-party application is not listed in the predetermined list.

In some embodiments, the predetermined list is a list of at least one application with a positioning accuracy reaching up to a predetermined threshold.

That is, the predetermined list is a list of the at least one application that requires a high-accuracy GPS positioning. A value M can be configured to represent the number of times that the at least one application in the predetermined list being invoked, and the value M may be considered as a number of times the at least one application being invoked with a high-accuracy when performs positioning. A value N can be configured to represent the number of times other applications not in the predetermined list being invoked, and the value N may be considered as a number of times other applications being invoked without a high-accuracy when performs positioning. A value Z can be configured to represent a total number of operations, and Z=M+N.

The current third-party application is determined whether or not it is listed in the predetermined list when activated by the user and when the user activates the positioning system via the current third-party application. The number of times that the at least one application in the predetermined list being invoked may be changed into M+1, and the total number of operations may be changed into (M+1)+N when the current third-party application is listed in the predetermined list. The number of times that the at least one application in the predetermined list being invoked may be remained and unchanged, the number of times other applications that do not require a high positioning accuracy is changed into (N+1), and the total number of operations is changed into M+(N+1) when the current third-party application is not listed in the predetermined list.

At block S222, the total number of operations that the user operating the plurality of third-party applications, which apply the positioning system in the electronic device, is obtained, and the number of times that the at least one application in the predetermined list being invoked, is obtained.

For example, the total number of operations that the user operating the plurality of third-party applications, which apply the positioning system in the electronic device, may be 20, and the number of times that the at least one application in the predetermined list being invoked may be 14.

At block S223, the operation preference information of the user operating the current third-party application, which applies the positioning system in the electronic device, is determined, according to a corresponding relationship of the number of times that the at least one application in the predetermined list being invoked and the total number of operations.

In an embodiment, the operation preference information of the user operating the current third-party application, which applies the positioning system in the electronic device, may be determined, according to a corresponding relationship of the value M representing the number of times that the at least one application in the predetermined list being invoked, and the value N representing the number of times other applications not in the predetermined list being invoked. For example, the operation preference information is determined as a high-accuracy positioning operation when the value M is greater than the value N, and a difference between the value M and the value N is greater a predetermined difference. For example. For another example, the operation preference information is determined as a low-accuracy positioning operation when the value N is greater than the value M, and the difference between the value N and the value M is greater a predetermined difference.

In an embodiment, the block S223 can be implemented by performing block S2231 and block S2232.

At block S2231, the operation preference information is determined as a high-accuracy positioning operation when the ratio, of the number of times that the at least one application in the predetermined list being invoked to the total number of operations, reaches up to a predetermined ratio.

For example, the predetermined ratio is 0.6. When the ratio, of the number of times that the at least one application in the predetermined list being invoked to the total number of operations, reaches up to 0.6, it indicates that an amount of the applications being invoked and require a high-accuracy GPS is more than half of all of the applications in the historical recode. Thereby the operation preference information is determined as a high-accuracy positioning operation.

At block S2232, the operation preference information is determined as a low-accuracy positioning operation when the ratio, of the number of times that the at least one application in the predetermined list being invoked to the total number of operations, is less than a predetermined ratio.

For example, the predetermined ratio is 0.6. When the ratio, of the number of times that the at least one application in the predetermined list being invoked to the total number of operations, is 0.4, it indicates that an amount of the applications being invoked and require a high-accuracy GPS is a relatively small number, basing on the historical operation record. Thereby the operation preference information is determined as a low-accuracy positioning operation.

In an embodiment, the block S22 is also implemented as follows:

The total number of operations and a total operation time that the user operating the plurality of third-party applications, which apply the positioning system in the electronic device is obtained. The number of times and a total invoked time that the at least one application in the predetermined list being invoked is obtained. Thereby a first usage frequency of the at least one application in the predetermined list and a second usage frequency of the at least one of the plurality of third-party applications which is not in the predetermined list are obtained.

The operation preference information is determined as a high-accuracy positioning operation when the first usage frequency is larger than the second usage frequency.

The operation preference information is determined as a low-accuracy positioning operation when the first usage frequency is smaller than or equal to the second usage frequency.

For example, the total number of operations that the user operating the plurality of third-party applications, which apply the positioning system in the electronic device is 20, and the total operation time of the plurality of third-party application is 60 minutes, and the number of times that the at least one application in the predetermined list being invoked is 10 times, and the total invoked time of the at least one application in the predetermined list is 40 minutes. Such that the first usage frequency of the at least one application in the predetermined list is four times per minutes, and the second usage frequency of the at least one of the plurality of third-party applications which is not in the predetermined list is twice per minutes. Thereby the first usage frequency of the at least one application in the predetermined list is larger than the second usage frequency of the at least one of the plurality of third-party applications which is not in the predetermined list, resulting in that the operation preference information is determined as a high-accuracy positioning operation.

In block S23, the positioning accuracy grade of the positioning system is correspondingly determined correspondingly based on the operation preference information, wherein the positioning accuracy grade includes a first grade and a second grade, wherein a positioning accuracy of the first grade is higher than that of the second grade.

In some embodiments, a tips can be provided to the user when the positioning accuracy grade of the positioning system is determined correspondingly based on the operation preference information. So that the user can be reminded to determine or not to determine the positioning accuracy grade of the positioning system. Thereby the positioning accuracy grade can be customized by the user, basing on actual requirements of the user.

In an embodiment, the block S23 can be implemented by performing block S231 and block S232.

At block S231, the positioning accuracy grade of the positioning system may be determined as the first grade, when the operation preference information is determined as a high-accuracy positioning operation.

For example, the positioning accuracy of the first grade is 100 meters. The positioning accuracy grade of the positioning system may be determined as the first grade, when the operation preference information is determined as a high-accuracy positioning operation, and the positioning accuracy of the corresponding GPS for transmitting is changed into 100 meters. Thereby a high accuracy positioning can be achieved.

As illustrated in FIG. 3, a map navigation application is taken for an example. When a user A starts the map navigation application and prepares to go to a location B, a prompt for reminding the user to determine the positioning accuracy grade may be displayed in an interface of the map navigation application. The prompt for reminding the user to determine the positioning accuracy grade may include a button with item of "first grade" and a button with item of "second grade". Display parameters of the button with item of "first grade" may be changed when the electronic device obtains a high-accuracy positioning operation performed by the user A on the current third-party application. The display parameters may include brightness, color, transparency, dynamic flicker, etc. For example, the color of the button with item of "first grade" is changed into a conspicuous color. A countdown of operation may also be displayed in the button with item of "first grade", to remind the user to select another positioning accuracy grade before the countdown ends. The positioning accuracy grade of the positioning system is determined automatically as the first grade, when the countdown ends. For example, the countdown of operation may by started with words "first grade (5S)" displayed on the button, and when the countdown of operation ends with "first grade (0S)" displayed on the button, the positioning accuracy grade of the positioning system is determined automatically into the first grade. In other embodiments, the user can manually select other positioning accuracy grades before the countdown ends, basing on his actual requirements. For example, the user may also manually select the second grade with lower positioning accuracy before the countdown end, when the prompt for positioning accuracy grade determination is displayed, and a power of current electronic device is getting low, and the user needs to ensure a normal operation of the electronic device.

At block S232, the positioning accuracy grade of the positioning system may be determined as the second grade, when the operation preference information is determined as a low-accuracy positioning operation.

For example, the positioning accuracy of the second grade is 500 meters. The positioning accuracy grade of the positioning system may be determined as the second grade, when the operation preference information is determined as a low-accuracy positioning operation, and the positioning accuracy of the corresponding GPS for transmitting is changed into 500 meters. Thereby a fast response for positioning can be achieved.

As illustrated in FIG. 4, a weather forecast application is taken as an example, when the user starts the weather forecast application, a prompt for reminding the user to determine the positioning accuracy grade may be displayed in an interface of the map navigation application. The prompt for reminding the user to determine the positioning accuracy grade may include a button with item of "first grade" and a button with item of "second grade". Display parameters of the button with item of "second grade" may be changed when the electronic device obtains a low-accuracy positioning operation of the user operating the current third-party application. The display parameters may include brightness, color, transparency, dynamic flicker, etc. For example, the color of the button with item of "second grade" is changed into a conspicuous color. A countdown of operation may also be displayed in the button with item of "second grade". The positioning accuracy grade of the positioning system is determined automatically as the second grade, when the countdown ends. For example, the countdown of operation may by started with words "second grade (5S)" displayed on the button, and when the countdown of operation ends with "second grade (0S)" displayed on the button, the positioning accuracy grade of the positioning system is determined automatically into the second grade. In other embodiments, the user can manually select a corresponding positioning accuracy grade before the countdown ends, basing on his current requirements. For example, the user may also manually select the first grade with higher positioning accuracy before the countdown end.

In an embodiment, the positioning accuracy grade of the positioning system may also be determined according to an application type of the current third-party application. The application type of the current third-party application can be determined after matching the current third-party application that is currently activated and applying the positioning system with the application information stored in the predetermined list. The application information may include information such as application names and default positioning accuracy values. The application type of the current third-party application can be determined by matching an application name of the current third-party application with the application names in the predetermined list. For example, the predetermined list is a list of at least one application with a positioning accuracy reaching up to the predetermined threshold, that is, the predetermined list is a list of at least one application that requires a high-accuracy GPS positioning. The application type of the at least one application in the predetermined list can be determined as a high-accuracy positioning type, and the application type of other applications that is not in the predetermined list can be determined as a low-accuracy positioning type. The positioning accuracy grade of the positioning system may be determined as the first grade, when the application type of the current third-party application is determined as a high-accuracy positioning type. The positioning accuracy grade of the positioning system may be determined as the second grade, when the application type of the current third-party application is determined as a high-accuracy positioning type.

In the method provided by the embodiments of the present disclosure, the predetermined list can be created, wherein the predetermined list is a list of at least one application with a positioning accuracy reaching up to the predetermined threshold; the operation preference information of a user operating a current third-party application selected from a plurality of third-party application can be obtained, which applies a positioning system in an electronic device; and then the positioning accuracy grade of the positioning system is correspondingly determined correspondingly based on the operation preference information. Thus, the embodiment of the disclosure can determine the positioning accuracy grade of the GPS according to the operation habit of the user when applying the GPS, therefore different requirements of different users can be meet, and power-saving and a fast response for positioning can be achieved.

The embodiments of the disclosure further provide a device for determining a positioning accuracy grade. The device may include:

a creating module, configured to create a predetermined list, wherein the predetermined list includes at least one application with a positioning accuracy reaching up to a predetermined threshold;

an obtaining module, configured to obtain operation preference information of a user operating a current third-party application selected from a plurality of third-party application, which applies a positioning system in an electronic device; and a determination module, configured to determine the positioning accuracy grade of the positioning system, correspondingly based on the operation preference information, wherein the positioning accuracy grade includes a first grade and a second grade, wherein a positioning accuracy of the first grade is higher than that of the second grade.

In some embodiments, the obtaining module may include:

an obtaining sub-module, configured to obtain a total number of operations that the user operating the plurality of third-party applications, which apply the positioning system in the electronic device, and a number of times that the at least one application in the predetermined list being invoked; and a determining sub-module, configured to determine the operation preference information of the user operating the current third-party application, which applies the positioning system in the electronic device, according to a corresponding relationship of the number of times that the at least one application in the predetermined list being invoked and the total number of operations.

In some embodiments, the obtaining module further includes:

an ascertaining sub-module, configured to determine whether or not the current third-party application is listed in the predetermined list when the user activates the positioning system via the current third-party application; and a counting sub-module, configured to:
increase the number of times that the at least one application in the predetermined list being invoked by one, and increase the total number of operations that the user operating the plurality of third-party applications by one, which apply the positioning system in the electronic device, when the current third-party application is listed in the predetermined list; and maintain the number of times that the at least one application in the predetermined list being invoked, and increase the total number of operations that the user operating the plurality of third-party applications by one, which apply the positioning system in the electronic device, when the current third-party application is not listed in the predetermined list.

In some embodiments, the first determining sub-module is configured to:

determine the operation preference information as a high-accuracy positioning operation when a ratio, of the number of times that the at least one application in the predetermined list being invoked to the total number of operations, reaches up to a predetermined ratio; and determine the operation preference information as a low-accuracy positioning operation when the ratio, of the number of times that the at least one application in the predetermined list being invoked to the total number of operations, is smaller than the predetermined ratio.

In some embodiments, the obtaining sub-module is further configured to:

obtain the total number of operations and a total operation time that the user operating the plurality of third-party applications, which apply the positioning system in the electronic device;

obtain a number of times and a total invoked time that the at least one application in the predetermined list being invoked; and thereby obtain a first usage frequency of the at least one application in the predetermined list and a second usage frequency of at least one of the plurality of third-party applications which is not in the predetermined list, basing on total number of operations, the total operation time, the invoked time, and the number of times that the at least one application in the predetermined list being invoked.

The determining sub-module is further configured to:

determine the operation preference information as a high-accuracy positioning operation when the first usage frequency of the at least one application in the predetermined list is larger than the second usage frequency of the at least one of the plurality of third-party applications which is not in the predetermined list; and determine the operation preference information as a low-accuracy positioning operation when the first usage frequency of the at least one application in the predetermined list is smaller than or equal to the second usage frequency of the at least one of the plurality of third-party applications which is not in the predetermined list.

In some embodiments, the determination module includes:

a first determination sub-module, configured to determine the positioning accuracy grade of the positioning system as the first grade, when the operation preference information is determined as a high-accuracy positioning operation; and a second determination sub-module, configured to determine the positioning accuracy grade of the positioning system as the second grade, when the operation preference information is determined as a low-accuracy positioning operation.

Figure 5:
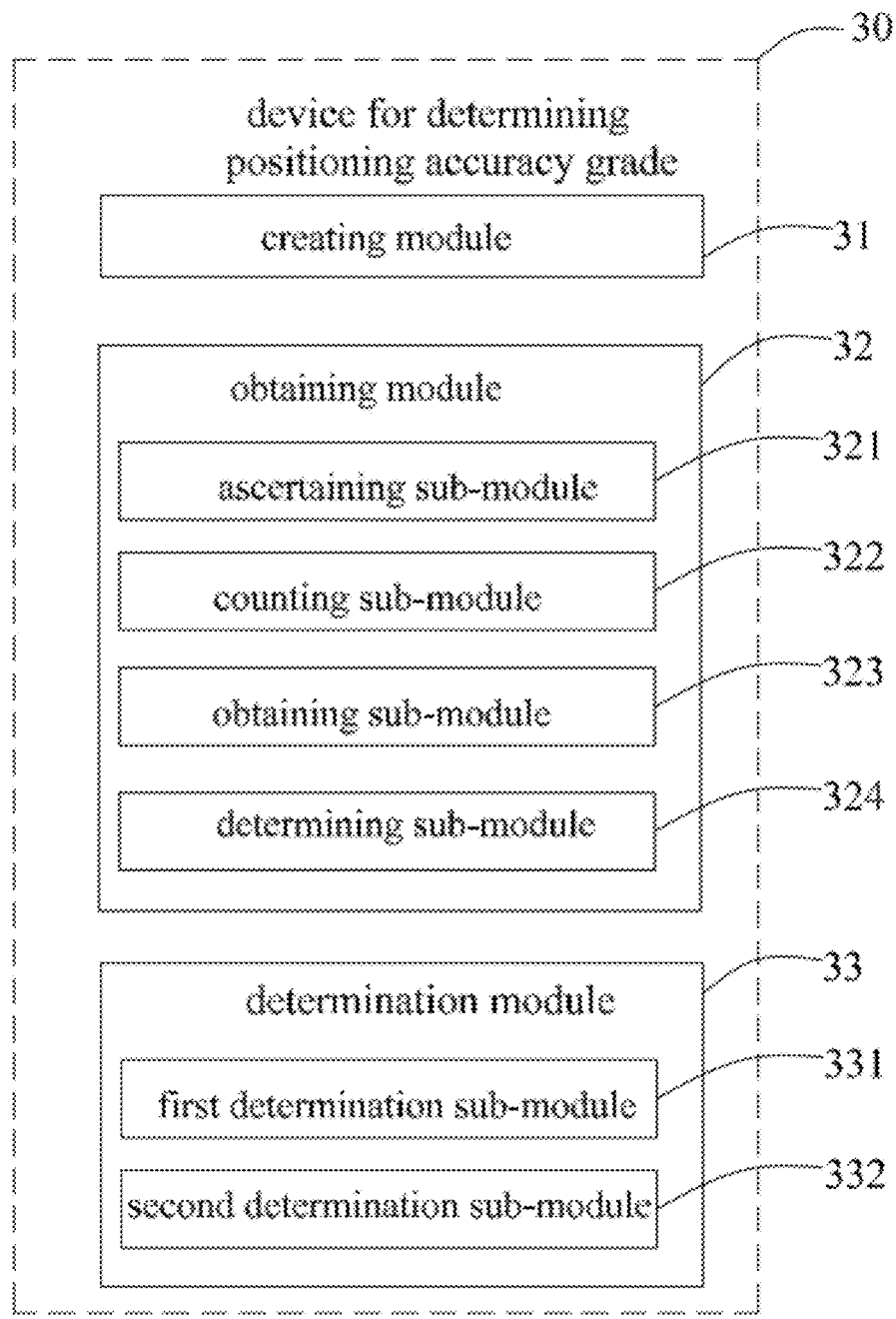
FIG. 5 illustrates a schematic view of a device for determining a positioning accuracy grade, in accordance with an embodiment of the present disclosure.

In order to better implement the above method, another device for determining a positioning accuracy grade is provided, in accordance with the embodiments of the present disclosure. As illustrated in FIG. 5, FIG. 5 illustrates a schematic view of a device for determining a positioning accuracy grade, in accordance with an embodiment of the present disclosure. The device for determining a positioning accuracy grade 30 includes a creating module 31, an obtaining module 32, and a determination module 33.

The creating module 31 is configured to create a predetermined list. The predetermined list is a list of at least one application with a positioning accuracy reaching up to a predetermined threshold.

In some embodiments, the creating module 31 can be configured to create an application list of applications based on a positioning service, via a big data services, by capturing data from an application platform or an application market. The application list can include applications, such as a map navigation application, a rescue service application, an enterprise employee management application, a vehicle scheduling application, a logistics application, a monitoring application, a shopping application, a weather forecast application, and acquisition information about family lives (such as clothing, food, housing and travel information) application. Some of these applications require a higher positioning accuracy when in service, such as a map navigation application, a rescue service application, an enterprise employee management application, a vehicle scheduling application. A vehicle rescue application can be taken as an example for the rescue service application. For example, a user of the vehicle may transmit positioning information via the vehicle rescue application. A vehicle rescue service provider can go and rescue the user basing on the positioning information. At this time, a higher positioning accuracy is required in rescue, for example, the positioning accuracy may be 50 meters. So that the vehicle rescue service provider can arrive at the location of the user accurately and quickly. However, some of the applications do not require a high positioning accuracy, such as a shopping application, a weather forecast application, etc. In the case of a weather application, the positioning accuracy of the weather applications may be 1000 meters, and a weather forecast of a city where the user is located can be obtained when the user is positioning with the positioning accuracy of 1000 meters. And then the creating module 32 is configured to sift the at least one application with the positioning accuracy reaching up to the predetermined threshold from the application list. For example, the predetermined threshold may be 100 meters. Application information about all of the applications with the positioning accuracy reaching up to 100 meters is stored in the predetermined list, wherein the application information in the predetermined list may include information such as application names, and default positioning accuracy values of the applications, etc. The predetermined threshold may be configured by a user, or may be determined according to an experimental test data, and examples in the description are not limited to the present disclosure.

The obtaining module 32 is configured to obtain operation preference information of a user operating a current third-party application selected from a plurality of third-party application, which applies a positioning system in an electronic device.

In some embodiments, the obtaining module 32 can be configured to obtain the operation preference information of the user by counting a historical operation record about the plurality third-party application that applies the positioning system in the electronic device. The obtaining module 32 can be further configured to analysis and obtain an operation habit and a requirement of the user. For example, the GPS may usually work to perform a navigation function when activated by some users. In some embodiments, the GPS may usually work when other users are shopping or watching weather forecasts.

A range of the historical operation record can be determined according to actual requirements. For example, the historical operation record can be generated basing a range from a first time the electronic device enters Network to a closing time of using. For another example, the historical operation record can be generated according to historical operations of the user in the last month.

The obtaining module 32 further includes an ascertaining sub-module 321, a counting sub-module 322, an obtaining sub-module 323, and a determining sub-module 324.

The ascertaining sub-module 321 is configured to determine whether or not the current third-party application is listed in the predetermined list when the user activates the positioning system via the current third-party application.

The counting sub-module 322 is configured to increase the number of times that the at least one application in the predetermined list being invoked by one, and increase the total number of operations by one when the current third-party application is listed in the predetermined list, and is further configured to maintain the number of times that the at least one application in the predetermined list being invoked, and increase the total number of operations that the user operating the plurality of third-party applications by one, which apply the positioning system in the electronic device, when the current third-party application is not listed in the predetermined list.

In some embodiments, the predetermined list is a list of at least one application with a positioning accuracy reaching up to a predetermined threshold.

That is, the predetermined list is a list of the at least one application that requires a high-accuracy GPS positioning. A value M can be configured to represent the number of times that the at least one application in the predetermined list being invoked, and the value M may be considered as a number of times that the at least one application being invoked with a high-accuracy when performs positioning. A value N can be configured to represent the number of times other applications not in the predetermined list being invoked, and the value N may be considered as a number of times other applications being invoked without a high-accuracy when performs positioning. A value Z can be configured to represent a total number of operations, and $Z=M+N$.

The ascertaining sub-module 321 can be configured to determine whether or not the current third-party application is listed in the predetermined list when activated by the user and when the user activates the positioning system via the current third-party application. The ascertaining sub-module 321 can be configured to change the number of times that the at least one application in the predetermined list being invoked to $M+1$, and be configured to change the total number of operations to $(M+1)+N$ when the current third-party application is listed in the predetermined list. The number of times that the at least one application in the predetermined list being invoked may be remained and unchanged, and the ascertaining sub-module 321 can be configured to change the number of times other applications that do not require a high positioning accuracy to $(N+1)$, and configured to change the total number of operations to $M+(N+1)$ when the current third-party application is not listed in the predetermined list.

The obtaining sub-module 323 is configured to acquire a total number of operations that the user operating the plurality of third-party applications, which apply the positioning system in the electronic device, and the number of times that the at least one application in the predetermined list being invoked.

For example, the obtaining sub-module 323 is configured to determine the total number of operations that the user operating the plurality of third-party applications, which apply the positioning system in the electronic device, as 20, and configured to determine the number of times that the at least one application in the predetermined list being invoked as 14.

The determining sub-module 324 is configured to determine the operation preference information of a user operating a current third-party application selected from a plurality of third-party application, which applies a positioning system in an electronic device, according to a corresponding relationship of the number of times that the at least one application in the predetermined list being invoked and the total number of operations.

In an embodiment, the determining sub-module 324 is configured to determine the operation preference information of a user operating a current third-party application selected from a plurality of third-party application, which applies a positioning system in an electronic device, according to a corresponding relationship of the value M representing the number of times that the at least one application in the predetermined list being invoked, and the value N representing the number of times other applications not in the predetermined list being invoked. For example, the operation preference information is determined as a high-accuracy positioning operation when the value M is greater than the value N, and a difference between the value M and the value N is greater a predetermined difference. For example. For another example, the operation preference information is determined as a low-accuracy positioning operation when the value N is greater than the value M, and the difference between the value N and the value M is greater a predetermined difference.

In an embodiment, the determining sub-module 324 is further configured to determine the operation preference information as a high-accuracy positioning operation when the ratio, of the number of times that the at least one application in the predetermined list being invoked to the total number of operations, reaches up to a predetermined ratio.

For example, the predetermined ratio is 0.6. When the ratio, of the number of times that the at least one application in the predetermined list being invoked to the total number of operations, reaches up to 0.6, it indicates that an amount of the applications being invoked and require a high-accuracy GPS is more than half of all of the applications in the historical recode. Thereby the operation preference information is determined as a high-accuracy positioning operation.

The determining sub-module 324 is further configured to determine the operation preference information as a low-accuracy positioning operation when the ratio, of the number of times that the at least one application in the predetermined list being invoked to the total number of operations, is less than a predetermined ratio.

For example, the predetermined ratio is 0.6. When the ratio, of the number of times that the at least one application in the predetermined list being invoked to the total number of operations, is 0.4, it indicates that an amount of the applications being invoked and require a high-accuracy GPS is a relatively small number, basing on the historical operation record. Thereby determining sub-module 324 is further configured to determine the operation preference information as a low-accuracy positioning operation.

In an embodiment, the obtaining sub-module 323 is further configured to:

obtain the total number of operations and a total operation time that the user operating the plurality of third-party application which apply the positioning system in the electronic device;

obtain a number of times and a total invoked time that the at least one application in the predetermined list being invoked; and thereby obtain a first usage frequency of the at least one application in the predetermined list and a second usage frequency of at least one of the plurality of third-party applications which is not in the predetermined list.

The determining sub-module 324 is further configured to:

determine the operation preference information as a high-accuracy positioning operation when the first usage frequency of the at least one application in the predetermined list is larger than the second usage frequency of the at least one of the plurality of third-party applications which is not in the predetermined list; and determine the operation preference information as a low-accuracy positioning operation when the first usage frequency of the at least one application in the predetermined list is smaller than or equal to the second usage frequency of the at least one of the plurality of third-party applications which is not in the predetermined list.

For example, the obtaining sub-module 323 determines the total number of operations that the user operating the plurality of third-party applications, which apply the positioning system in the electronic device as 20, and determines the total operation time of the plurality of third-party application as 60 minutes, and determines the number of times that the at least one application in the predetermined list being invoked as 10 times, and determines the total invoked time of the at least one application in the predetermined list as 40 minutes. Such that the first usage frequency of the at least one application in the predetermined list is four times per minutes, and the usage frequency of the at least one of the plurality of third-party applications which is not in the predetermined is twice per minutes. Thereby the first usage frequency of the at least one application in the predetermined list is larger than the second usage frequency of the at least one of the plurality of third-party applications which is not in the predetermined list, and the obtaining sub-module 323 therefore determines the operation preference information is determined as a high-accuracy positioning operation.

The determination module 33 is configured to determine the positioning accuracy grade of the positioning system correspondingly, correspondingly based on the operation preference information. The positioning accuracy grade includes a first grade and a second grade, wherein a positioning accuracy of the first grade is higher than that of the second grade.

The determination module 33 further includes a first determination sub-module 331 and a second determination sub-module 332.

The first determination sub-module 331 is configured to determine the positioning accuracy grade of the positioning system as the first grade, when the operation preference information is determined as a high-accuracy positioning operation.

For example, the positioning accuracy of the first grade is 100 meters. The first determination sub-module 331 can determine the positioning accuracy grade of the positioning system as the first grade, when the operation preference information is determined as a high-accuracy positioning operation, and the positioning accuracy of the corresponding GPS for transmitting is changed into 100 meters. Thereby a high accuracy positioning can be achieved.

The second determination sub-module 332 is configured to determine the positioning accuracy grade of the positioning system as the second grade, when the operation preference information is determined as a low-accuracy positioning operation.

For example, the positioning accuracy of the second grade is 500 meters. The second determination sub-module 332 is configured to determine the positioning accuracy grade of the positioning system as the second grade, when the operation preference information is determined as a low-accuracy positioning operation, and the positioning accuracy of the corresponding GPS for transmitting is changed into 500 meters. Thereby a fast response for positioning can be achieved.

In an embodiment, the determination module 33 can be configured to determine the positioning accuracy grade of the positioning system according to an application type of the current third-party application that is currently activated and applying the positioning system. The application type of the current third-party application can be determined after matching the current third-party application with the application information stored in the predetermined list. The application information may include information such as application names and default positioning accuracy values. The application type of the current third-party application can be determined by matching an application name of the current third-party application with the application names in the predetermined list. For example, the predetermined list is a list of at least one application with a positioning accuracy reaching up to the predetermined threshold, that is, the predetermined list is a list of the at least one application that requires a high-accuracy GPS positioning. The application type of the at least one application in the predetermined list can be determined as a high-accuracy positioning type, and the application type of other applications that is not in the predetermined list can be determined as a low-accuracy positioning type. The determination module 33 can be configured to determine the positioning accuracy grade of the positioning system as the first grade, when the application type of the current third-party application is determined as a high-accuracy positioning type. The determination module 33 can be configured to determine the positioning accuracy grade of the positioning system as the second grade, when the application type of the current third-party application is determined as a high-accuracy positioning type.

Figure 6:
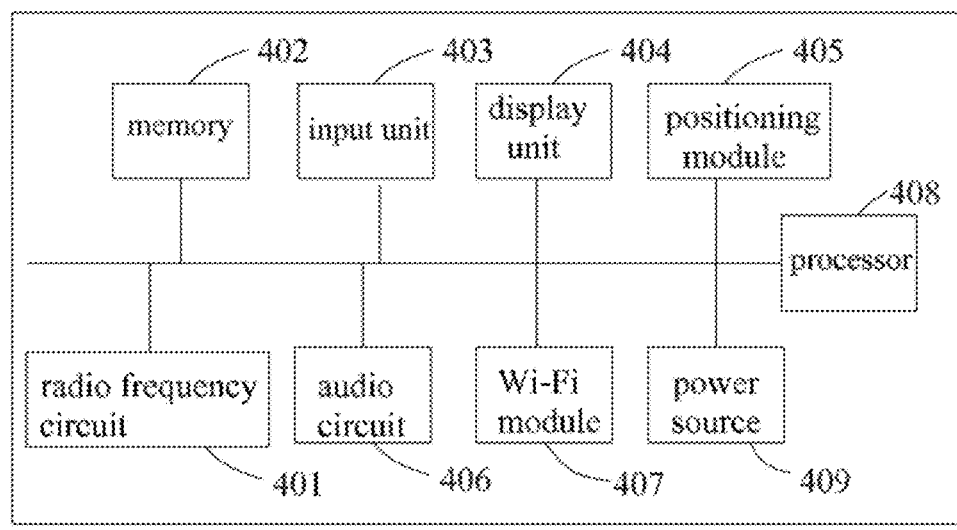
FIG. 6 illustrates a schematic view of an electronic device, in accordance with an embodiment of the present disclosure.

An electronic device is further provided, in accordance with an embodiment of the present disclosure. As illustrated in FIG. 6, FIG. 6 illustrates a schematic view of the electronic device, in accordance with an embodiment of the present disclosure. The electronic device 400 can include a radio frequency (RF) circuit 401, a memory 402 including one or more computer readable storage media, an input unit 403, a display unit 404, a positioning module 405, an audio circuit 406, and a wireless fidelity (Wi-Fi) module 407, a processor 408 including one or more processing cores, and a power supply 409, etc. It will be understood by those skilled in the art that the electronic device structure illustrated in FIG. 6 does not constitute a limitation on the electronic device, and the electronic device may include more or less components than those illustrated, the electronic device may also include combinations of some of the above components, or the electronic device may also have different component arrangements from those illustrated in FIG. 6.

The radio frequency circuit 401 can be configured to transmit and receive signals associating with information, or be configured to receive and transmit signals during a call.

The memory 402 can be configured to store applications and data. The applications stored in the memory 402 may contain a computer program.

The input unit 403 can be configured to receive input information such as numbers, characters, and user characteristic information (such as fingerprints), and to generate input information associating with a keyboard, a mouse, a joystick, an optical input, or a trackball signal input basing on user configurations and controls.

The display unit 404 can be configured to display information inputted by the user, or configured to display information provided to the user and various graphical interfaces of the electronic device. The graphical interfaces can include any of graphics, text, icons, video, and any combination thereof.

The positioning module 405 can be configured to provide a location positioning service of the electronic device, such as a GPS positioning module.

The audio circuit 406 can be configured to provide an audio interface between the user and the electronic device via a speaker and a microphone.

The Wireless Fidelity (Wi-Fi) module 407 can be used for short-range wireless transmission, and can help users to send and receive emails, browse websites, and access streaming media. It provides users with wireless broad and Internet access.

The processor 408 may be a control center of the electronic device, which couple components of the entire electronic device via various interfaces and lines, executes the electronic device. The processor 408 may be configured to perform a process function and functions of the electronic device by running or executing an application program stored in the memory 402, and by invoking data stored in the memory 402. Thereby the processor 408 may be performing overall monitoring to the electronic device.

The electronic device further includes a power source 409 (such as a battery) that powers the electronic components of the electronic device.

Although not illustrated in FIG. 6, the electronic device may further include a camera, a Bluetooth module, and other electronic components, and details are not described herein again.

Specifically, in this embodiment, the processor 408 in the electronic device loads computer programs corresponding to the process of one or more applications into the memory 402 basing on the following instructions, and one or more applications stored in the memory 402 may be executed by the processor 408. The application in 402 is configured to:

create a predetermined list, wherein the predetermined list is a list of at least one application with a positioning accuracy reaching up to a predetermined threshold;

obtain operation preference information of a user operating a current third-party application selected from a plurality of third-party application, which applies a positioning system in an electronic device; and determine the positioning accuracy grade of the positioning system correspondingly based on the operation preference information, wherein the positioning accuracy grade includes a first grade and a second grade, wherein a positioning accuracy of the first grade is higher than that of the second grade.

In some embodiments, the processor 408 is configured to obtain the operation preference information of a user operating a current third-party application selected from a plurality of third-party application, which applies a positioning system in an electronic device. When obtaining the operation preference information, the process 408 is configured to:

obtain a total number of operations that the user operating the plurality of third-party applications, which apply the positioning system in the electronic device, and a number of times that the at least one application in the predetermined list being invoked; and determine the operation preference information of the user operating the current third-party application, which applies the positioning system in the electronic device, according to a corresponding relationship of the number of times that the at least one application in the predetermined list being invoked and the total number of operations.

In some embodiments, before the processor 408 obtains the total number of operations that the user operating the plurality of third-party applications, which apply the positioning system in the electronic device, and the number of times that the at least one application in the predetermined list being invoked, the processor 408 may be further configured to:

determine whether or not the current third-party application is listed in the predetermined list when the user activates the positioning system via the current third-party application; and increase the number of times that the at least one application in the predetermined list being invoked by one, and increase the total number of operations that the user operating the plurality of third-party applications by one, which apply the positioning system in the electronic device, when the current third-party application is listed in the predetermined list; and maintain the number of times that the at least one application in the predetermined list being invoked, and increase the total number of operations that the user operating the plurality of third-party applications by one, which apply the positioning system in the electronic device, when the current third-party application is not listed in the predetermined list.

In some embodiments, when determining the operation preference information of the user operating the current third-party application, which applies the positioning system in the electronic device, according to the corresponding relationship of the number of times that the at least one application in the predetermined list being invoked and the total number of operations, the processor 108 is configured to:

determine the operation preference information as a high-accuracy positioning operation when a ratio, of the number of times that the at least one application in the predetermined list being invoked to the total number of operations, reaches up to a predetermined ratio; and determine the operation preference information as a low-accuracy positioning operation when the ratio, of the number of times that the at least one application in the predetermined list being invoked to the total number of operations, is smaller than the predetermined ratio.

In some embodiments, when obtaining the operation preference information of a user operating a current third-party application selected from a plurality of third-party application, which applies a positioning system in an electronic device, the processor 408 is configured to:

obtain the total number of operations and a total operation time that the user operating the plurality of third-party applications, which apply the positioning system in the electronic device;

obtain a number of times and a total invoked time that the at least one application in the predetermined list being invoked; and thereby obtain a first usage frequency of the at least one application in the predetermined list and a second usage frequency of at least one of the plurality of third-party applications which is not in the predetermined list, basing on total number of operations, the total operation time, the invoked time, and the number of times that the at least one application in the predetermined list being invoked;

determine the operation preference information as a high-accuracy positioning operation when the first usage frequency of the at least one application in the predetermined list is larger than the second usage frequency of the at least one of the plurality of third-party applications which is not in the predetermined list; and determine the operation preference information as a low-accuracy positioning operation when the first usage frequency of the at least one application in the predetermined list is smaller than or equal to the second usage frequency of the at least one of the plurality of third-party applications which is not in the predetermined list.

In some embodiments, when determining the positioning accuracy grade of the positioning system correspondingly based on the operation preference information, the processor 408 is configured to:

determine the positioning accuracy grade of the positioning system as the first grade, when the operation preference information is determined as a high-accuracy positioning operation; and determine the positioning accuracy grade of the positioning system as the second grade, when the operation preference information is determined as a low-accuracy positioning operation.

In the above embodiments, the descriptions of the embodiments are different, and the details that are not detailed in an embodiment can be referred to related descriptions in other embodiments.

In the embodiment of the present disclosure, the device for determining a positioning accuracy grade belongs to the same concept as the method for determining a positioning accuracy grade in the above embodiments. The method for determining a positioning accuracy grade can be implemented on the device for determining a positioning accuracy grade. For the implementation process of any of the methods provided in the example, as described in the embodiments of the method for determining a positioning accuracy grade, and details are not described herein again.

The embodiments of the present disclosure further provide a storage medium. The storage medium stores a plurality of instructions, and the instructions are adapted to be executed by a processor to perform the method for determining a positioning accuracy grades provided by the embodiments of the present disclosure.

It should be noted that, in the method for determining a positioning accuracy grade in accordance with the present disclosure, a common tester in the art can understand all or part of the process for implementing the method for determining a positioning accuracy grade in the embodiments of the present disclosure, and the related program can be controlled by a computer program. The computer program can be stored in a computer readable storage medium, such as in a memory of the electronic device, and can be executed by at least one processor in the electronic device. When the computer program is executed, for example, it can perform the embodiments of the method for determining a positioning accuracy grade. The storage medium may be a magnetic disk, an optical disk, a read only memory (ROM), a random-access memory (RAM), etc.

For the device for determining a positioning accuracy grade in the embodiments of the present disclosure, each of the modules may be integrated into one processing chip, or each of the modules may exist physically separately, or two or more modules may be integrated into one module. The above integrated modules can be implemented in the form of hardware or in the form of software modules. The integrated module, when implemented in the form of a software functional module and sold or used as a standalone product, may also be stored in a computer readable storage medium, such as a read only memory, a magnetic disk or an optical disk, etc.

The method, device, storage medium and electronic device for determining the positioning accuracy grade provided by the embodiments of the present disclosure are described in detail. The principles and embodiments of the present disclosure are described in the above examples. The description is only used for helping to understand the technical solution of the present disclosure and its core idea. Those of ordinary skill in the art should understand that it can still modify the technical solutions described in foregoing embodiments, or replace some of the technical features. The modifications or substitutions do not depart from the scope of the technical solutions of the embodiments of the present disclosure.

What is claimed is:

1. A method for determining a positioning accuracy grade, comprising:

creating a predetermined list, wherein the predetermined list is a list of at least one application with a positioning accuracy reaching up to a predetermined threshold;

obtaining operation preference information of a user operating a current third-party application selected from a plurality of third-party applications, which applies a positioning system in an electronic device, including:

obtaining a total number of operations that the user operating the plurality of third-party applications, which apply the positioning system in the electronic device, and a number of times that the at least one application in the predetermined list being invoked;

determining the operation preference information according to a corresponding relationship of the number of times that the at least one application in the predetermined list being invoked and the total number of operations; and determining a positioning accuracy grade of the positioning system correspondingly based on the operation preference information, wherein the positioning accuracy grade includes a first grade and a second grade, and a positioning accuracy of the first grade is higher than that of the second grade.

2. The method of claim 1, wherein before the operation of obtaining the total number of operations that the user operating the plurality of third-party applications, which apply the positioning system in the electronic device, and the number of times that the at least one application in the predetermined list being invoked, the method further comprises:

determining whether or not the current third-party application is listed in the predetermined list when the user activates the positioning system via the current third-party application;

increasing the number of times that the at least one application in the predetermined list being invoked by one, and increasing the total number of operations by one, when the current third-party application is listed in the predetermined list; and maintaining the number of times that the at least one application in the predetermined list being invoked, and increasing the total number of operations by one, when the current third-party application is not listed in the predetermined list.

3. The method of claim 1, wherein the operation of determining the operation preference information according to a corresponding relationship of the number of times that the at least one application in the predetermined list being invoked and the total number of operations, comprises:

determining the operation preference information as a high-accuracy positioning operation when a ratio, of the number of times that the at least one application in the predetermined list being invoked to the total number of operations, reaches up to a predetermined ratio; and determining the operation preference information as a low-accuracy positioning operation when the ratio, of the number of times that the at least one application in the predetermined list being invoked to the total number of operations, is smaller than the predetermined ratio.

4. The method of claim 1, wherein the operation of determining the operation preference information according to the corresponding relationship of the number of times that the at least one application in the predetermined list being invoked and the total number of operations, comprises:

determining the operation preference information as a high-accuracy positioning operation when a ratio, of the number of times that the at least one application in the predetermined list being invoked to the total number of operations, reaches up to a predetermined ratio; and determining the operation preference information as a low-accuracy positioning operation when the ratio, of the number of times that the at least one application in the predetermined list being invoked to the total number of operations, is smaller than the predetermined ratio.

5. The method of claim 4, wherein the operation of determining a positioning accuracy grade of the positioning system correspondingly based on the operation preference information, comprises:

determining the positioning accuracy grade of the positioning system as the first grade, when the operation preference information is determined as a high-accuracy positioning operation; and determining the positioning accuracy grade of the positioning system as the second grade, when the operation preference information is determined as a low-accuracy positioning operation.

6. A device for determining a positioning accuracy grade, comprising:

a creating module, configured to create a predetermined list, wherein the predetermined list is a list of at least one application with a positioning accuracy reaching up to a predetermined threshold;

an obtaining module, configured to:
obtain operation preference information of a user operating a current third-party application selected from a plurality of third-party application, which applies a positioning system in an electronic device;

obtain a total number of operations and a total operation time that the user operating the plurality of third-party applications, which apply the positioning system in the electronic device;

obtain a number of times and a total invoked time that the at least one application in the predetermined list being invoked;

thereby obtain a first usage frequency of the at least one application in the predetermined list and a second usage frequency of at least one of the plurality of third-party applications which is not in the predetermined list; and determine the operation preference information according to the first usage frequency and the second usage frequency; and a determination module, configured to determine a positioning accuracy grade of the positioning system, correspondingly based on the operation preference information, wherein the positioning accuracy grade includes a first grade and a second grade, wherein a positioning accuracy of the first grade is higher than that of the second grade.

7. The device of claim 6, wherein the obtaining module is further configured to:

determine the operation preference information as a high-accuracy positioning operation when the first usage frequency is larger than the second usage frequency; and determine the operation preference information as a low-accuracy positioning operation when the first usage frequency is smaller than or equal to the second usage frequency.

8. The device of claim 7, wherein the determination module comprises:

a first determination sub-module, configured to determine the positioning accuracy grade of the positioning system as the first grade, when the operation preference information is determined as a high-accuracy positioning operation; and a second determination sub-module, configured to determine the positioning accuracy grade of the positioning system as the second grade, when the operation preference information is determined as a low-accuracy positioning operation.

9. An electronic device comprising a memory, a processor, and a computer program stored in the memory and configured to be executed by the processor, wherein the processor is configured to execute the computer program stored in the memory to perform:

creating a predetermined list, wherein the predetermined list is a list of at least one application with a positioning accuracy reaching up to a predetermined threshold;

obtaining operation preference information of a user operating a current third-party application selected from a plurality of third-party application, which applies a positioning system in an electronic device;

determining a positioning accuracy grade of the positioning system correspondingly based on the operation preference information, wherein the positioning accuracy grade includes a first grade and a second grade, including:

determining the positioning accuracy grade of the positioning system as a first grade, when the operation preference information is determined as a high-accuracy positioning operation; and determining the positioning accuracy grade of the positioning system as a second grade, when the operation preference information is determined as a low-accuracy positioning operation; and wherein a positioning accuracy of the first grade is higher than that of the second grade.

10. The electronic device of claim 9, wherein when obtaining the operation preference information, the processor is configured to:

obtain a total number of operations that the user operating the plurality of third-party applications, which apply the positioning system in the electronic device, and a number of times that the at least one application in the predetermined list being invoked; and determine the operation preference information according to a corresponding relationship of the number of times that the at least one application in the predetermined list being invoked and the total number of operations.

11. The electronic device of claim 10, wherein before the operation of obtaining the total number of operations that the user operating the plurality of third-party applications, which apply the positioning system in the electronic device, and the number of times that the at least one application in the predetermined list being invoked, the processor further configured to:

determine whether or not the current third-party application is listed in the predetermined list when the user activates the positioning system via the current third-party application;

increase the number of times that the at least one application in the predetermined list being invoked by one, and increase the total number of operations by one, when the current third-party application is listed in the predetermined list; and maintain the number of times that the at least one application in the predetermined list being invoked, and increase the total number of operations by one, when the current third-party application is not listed in the predetermined list.

12. The electronic device of claim 9, wherein when obtaining the operation preference information, the processor is configured to:

obtain a total number of operations and a total operation time that the user operating the plurality of third-party applications, which apply the positioning system in an electronic device;

obtain a number of times and a total invoked time that the at least one application in the predetermined list being invoked;

thereby obtain a first usage frequency of the at least one application in the predetermined list and a second usage frequency of the at least one of the plurality of third-party applications which is not in the predetermined list; and determine the operation preference information according to the first usage frequency and the second usage frequency.

13. The electronic device of claim 12, wherein when determining the operation preference information according to the first usage frequency and the second usage frequency, the processor is configured to:

determining the operation preference information as a high-accuracy positioning operation when the first usage frequency is larger than the second usage frequency; and determining the operation preference information as a low-accuracy positioning operation when the first usage frequency is smaller than or equal to second usage frequency.

14. The electronic device of claim 10, wherein when determining the operation preference information according to a corresponding relationship of the number of times that the at least one application in the predetermined list being invoked and the total number of operations, the processor is configured to:

determining the operation preference information as a high-accuracy positioning operation when a ratio, of the number of times that the at least one application in the predetermined list being invoked to the total number of operations, reaches up to a predetermined ratio; and determining the operation preference information as a low-accuracy positioning operation when the ratio, of the number of times that the at least one application in the predetermined list being invoked to the total number of operations, is smaller than the predetermined ratio.

15. The electronic device of claim 10, wherein when determining the operation preference information according to the corresponding relationship of the number of times that the at least one application in the predetermined list being invoked and the total number of operations, the processor is configured to:

determining the operation preference information as a high-accuracy positioning operation when a ratio, of the number of times that the at least one application in the predetermined list being invoked to the total number of operations, reaches up to a predetermined ratio; and determining the operation preference information as a low-accuracy positioning operation when the ratio, of the number of times that the at least one application in the predetermined list being invoked to the total number of operations, is smaller than the predetermined ratio.

16. The electronic device of claim 15, wherein when determining a positioning accuracy grade of the positioning system correspondingly based on the operation preference information, the processor is configured to:

determining the positioning accuracy grade of the positioning system as the first grade, when the operation preference information is determined as a high-accuracy positioning operation; and determining the positioning accuracy grade of the positioning system as the second grade, when the operation preference information is determined as a low-accuracy positioning operation.

17. The method of claim 1, wherein the operation of creating a predetermined list, wherein the predetermined list is a list of at least one application with a positioning accuracy reaching up to a predetermined threshold, comprises:

creating an application list of third-party applications which are based on a positioning service; and sifting at least one third-party application whose positioning accuracy is not less than a threshold from the application list, thereby creating the predetermined list.

18. The method of claim 17, wherein, wherein the predetermined list contains information about the total number of operations that the user operating all of the third-party applications that applies the position system and the number of times that all of the third-party applications in the predetermined list being invoked;

the operation of creating an application list of third-party applications which are based on a positioning service, comprises:

creating, via a big data service, an application list of third-party applications which are based on a positioning service, by capturing data from an application platform or an application market.

19. The method of claim 1, wherein the operation of obtaining a total number of operations that the user operating the plurality of third-party applications, which apply the positioning system in the electronic device, and a number of times that the at least one application in the predetermined list being invoked, comprises:

counting a historical operation record, of a user, about the third-party applications that apply the positioning system in the electronic device; wherein the historical operation record contains information about a number of times that all of the third-party applications being involved; and obtaining, according to the historical operation record, a total number of operations that the user operating the plurality of third-party applications, which apply the positioning system in the electronic device, and a number of times that the at least one application in the predetermined list being invoked.

20. The method of claim 19, wherein the operation of determining the operation preference information according to a corresponding relationship of the number of times that the at least one application in the predetermined list being invoked and the total number of operations, comprises:

analyzing, a corresponding relationship of the number of times that the at least one third-party application in the predetermined list being invoked and the total number of operations that the user operating the third-party application, to obtain an operation habit of the user according to the historical operation record and the predetermined list, thereby determining the operation preference information; wherein the operation preference information comprises a high-accuracy positioning operation and a low-accuracy positioning operation.

* * * * *